US010457313B2

(12) United States Patent
Nash et al.

(10) Patent No.: US 10,457,313 B2
(45) Date of Patent: Oct. 29, 2019

(54) ADAS WHEEL LOCKING DEVICE (71) Applicant: STEERING SOLUTIONS IP HOLDING CORPORATION, Saginaw, MI (US)

(72) Inventors: Richard P Nash, Frankenmuth, MI (US); Donald A. Buzzard, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 188 days.

(21) Appl. No.: 15/625,217

(22) Filed: Jun. 16, 2017

(65) Prior Publication Data

US 2017/0369091 A1 Dec. 28, 2017

Related U.S. Application Data (60) Provisional application No. 62/355,578, filed on Jun. 28, 2016.

(51) Int. Cl.
B62D 1/184 (2006.01)
B62D 1/181 (2006.01)
B62D 1/183 (2006.01)
B62D 1/185 (2006.01)
B62D 1/19 (2006.01)

(52) U.S. Cl.
CPC ............ B62D 1/184 (2013.01); B62D 1/181 (2013.01); B62D 1/183 (2013.01); B62D 1/185 (2013.01); B62D 1/192 (2013.01)

(58) Field of Classification Search
CPC ........ B62D 1/181; B62D 1/183; B62D 1/192; B62D 1/185; B62D 1/184

USPC .................................................. 74/492, 493
See application file for complete search history.

(56) References Cited

U.S. PATENT DOCUMENTS

| 1,795,567 | A | 3/1931 | Maurice |
| 3,369,425 | A | 2/1968 | Runkle et al. |
| 3,386,309 | A | 6/1968 | Reed et al. |
| 3,396,600 | A | 8/1968 | Zeigler et al. |
| 3,782,492 | A | 1/1974 | Hollins |
| 4,315,117 | A | 2/1982 | Kokubo et al. |
| 4,337,967 | A | 7/1982 | Yoshida et al. |
| 4,476,954 | A | 10/1984 | Johnson et al. |
| 4,503,300 | A | 3/1985 | Lane, Jr. |

(Continued)

FOREIGN PATENT DOCUMENTS

| CN | 1449952 A | 10/2003 |
| CN | 1550395 A | 12/2004 |

(Continued)

OTHER PUBLICATIONS

English translation regarding DE10201521632664, ThyssenKrupp AG; 21 pgs.

(Continued)

Primary Examiner — Toan C To (57) ABSTRACT

A steering column assembly includes a first shaft assembly, a second shaft assembly, and a locking assembly. The first shaft assembly has a first shaft. The second shaft assembly has a second shaft that is at least partially received within the first shaft. The locking assembly is disposed about at least one of the first shaft and the second shaft and is arranged to inhibit rotation of at least one of the first shaft and the second shaft.

19 Claims, 5 Drawing Sheets

(56) References Cited

U.S. PATENT DOCUMENTS

| | | |
|---|---|---|
| 4,503,504 A | 3/1985 | Suzumura et al. |
| 4,509,386 A | 4/1985 | Kimberlin |
| 4,535,645 A | 8/1985 | De Bisschop et al. |
| 4,559,816 A | 12/1985 | Ebert et al. |
| 4,561,323 A | 12/1985 | Stromberg |
| 4,570,776 A | 2/1986 | Iwashita et al. |
| 4,598,604 A | 7/1986 | Sorsche et al. |
| 4,602,520 A | 7/1986 | Nishikawa et al. |
| 4,633,732 A | 1/1987 | Nishikawa et al. |
| 4,661,752 A | 4/1987 | Nishikawa et al. |
| 4,669,325 A | 6/1987 | Nishikawa et al. |
| 4,691,587 A | 9/1987 | Farrand et al. |
| 4,785,684 A | 11/1988 | Nishikawa et al. |
| 4,811,580 A | 3/1989 | Jang |
| 4,836,566 A | 6/1989 | Birsching |
| 4,881,020 A | 11/1989 | Hida et al. |
| 4,893,518 A | 1/1990 | Matsumoto et al. |
| 4,901,544 A | 2/1990 | Jang |
| 4,901,593 A | 2/1990 | Ishikawa |
| 4,921,066 A | 5/1990 | Conley |
| 4,941,679 A | 7/1990 | Baumann et al. |
| 4,943,028 A | 7/1990 | Hoffmann et al. |
| 4,962,570 A | 10/1990 | Hosaka et al. |
| 4,967,618 A | 11/1990 | Matsumoto et al. |
| 4,976,239 A | 12/1990 | Hosaka |
| 5,048,364 A | 9/1991 | Minamoto et al. |
| 5,226,853 A * | 7/1993 | Courgeon ............ B62D 1/185 277/500 |
| 5,240,284 A | 8/1993 | Takada et al. |
| 5,295,712 A | 3/1994 | Omura |
| 5,319,803 A | 6/1994 | Allen |
| 5,428,873 A | 7/1995 | Hitchcock et al. |
| 5,488,555 A | 1/1996 | Asgari et al. |
| 5,590,565 A | 1/1997 | Palfenier et al. |
| 5,606,892 A * | 3/1997 | Hedderly ............... B62D 1/16 280/775 |
| 5,613,404 A | 3/1997 | Lykken et al. |
| 5,618,058 A | 4/1997 | Byon |
| 5,668,721 A | 9/1997 | Chandy |
| 5,678,454 A * | 10/1997 | Cartwright ........... B62D 1/184 74/493 |
| 5,690,362 A | 11/1997 | Peitsmeier et al. |
| 5,737,971 A | 4/1998 | Riefe et al. |
| 5,765,116 A | 6/1998 | Wilson-Jones et al. |
| 5,813,699 A | 9/1998 | Donner et al. |
| 5,890,397 A | 4/1999 | Stoner et al. |
| 5,893,580 A | 4/1999 | Hoagland et al. |
| 5,911,789 A | 6/1999 | Keipert et al. |
| 5,931,250 A | 8/1999 | Kagawa et al. |
| 5,941,130 A | 8/1999 | Olgren et al. |
| 6,041,677 A | 3/2000 | Reh et al. |
| 6,070,686 A | 6/2000 | Pollmann |
| 6,079,513 A | 6/2000 | Nishizaki et al. |
| 6,142,523 A | 11/2000 | Bathis et al. |
| 6,170,862 B1 | 1/2001 | Hoagland et al. |
| 6,220,630 B1 | 4/2001 | Sundholm et al. |
| 6,227,571 B1 | 5/2001 | Sheng et al. |
| 6,234,040 B1 | 5/2001 | Weber et al. |
| 6,264,239 B1 | 7/2001 | Link |
| 6,301,534 B1 | 10/2001 | McDermott, Jr. et al. |
| 6,343,993 B1 | 2/2002 | Duval et al. |
| 6,354,622 B1 | 3/2002 | Ulbrich et al. |
| 6,354,626 B1 * | 3/2002 | Cartwright ........... B62D 1/184 280/775 |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,460,427 B1 | 10/2002 | Hedderly |
| 6,571,587 B2 | 6/2003 | Dimig et al. |
| 6,578,449 B1 | 6/2003 | Anspaugh et al. |
| 6,611,745 B1 | 8/2003 | Paul |
| 6,612,198 B2 | 9/2003 | Rouleau et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,025,380 B2 | 4/2006 | Arihara |
| 7,048,305 B2 | 5/2006 | Muller |
| 7,062,365 B1 | 6/2006 | Fei |
| 7,140,213 B2 | 11/2006 | Feucht et al. |
| 7,159,904 B2 | 1/2007 | Schafer et al. |
| 7,213,842 B2 | 5/2007 | Uehle et al. |
| 7,258,365 B2 | 8/2007 | Kahlenberg et al. |
| 7,261,014 B2 | 8/2007 | Arihara |
| 7,290,800 B2 | 11/2007 | Schwarzbich et al. |
| 7,295,904 B2 | 11/2007 | Kanevsky et al. |
| 7,308,964 B2 | 12/2007 | Hara et al. |
| 7,410,190 B2 | 8/2008 | Sawada et al. |
| 7,428,944 B2 | 9/2008 | Gerum |
| 7,461,863 B2 | 12/2008 | Muller |
| 7,495,584 B1 | 2/2009 | Sorensen |
| 7,533,594 B2 | 5/2009 | Menjak et al. |
| 7,628,244 B2 | 12/2009 | Chino et al. |
| 7,719,431 B2 | 5/2010 | Bolourchi |
| 7,735,405 B2 | 6/2010 | Parks |
| 7,758,073 B1 | 7/2010 | Chou |
| 7,775,129 B2 | 8/2010 | Oike et al. |
| 7,784,830 B2 | 8/2010 | Ulintz |
| 7,793,980 B2 | 9/2010 | Fong |
| 7,862,079 B2 | 1/2011 | Fukawatase et al. |
| 7,975,569 B2 | 1/2011 | Klos |
| 7,894,951 B2 | 2/2011 | Norris et al. |
| 7,909,361 B2 | 3/2011 | Oblizajek et al. |
| 7,913,803 B2 | 3/2011 | Hidaka |
| 8,002,075 B2 | 8/2011 | Markfort |
| 8,011,265 B2 | 9/2011 | Menjak et al. |
| 8,021,235 B2 | 9/2011 | Tinnin et al. |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,161,839 B2 | 4/2012 | Warashina |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,376,402 B2 | 2/2013 | Yoon et al. |
| 8,466,382 B2 | 6/2013 | Donicke |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,733,201 B2 | 5/2014 | Okano et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,910,540 B2 | 12/2014 | Bertet et al. |
| 8,948,993 B2 | 2/2015 | Schulman et al. |
| 8,950,543 B2 | 2/2015 | Heo et al. |
| 8,955,407 B2 * | 2/2015 | Sakuma ................ B62D 1/185 280/777 |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,039,041 B2 | 5/2015 | Buzzard et al. |
| 9,045,078 B2 | 6/2015 | Tovar et al. |
| 9,073,574 B2 | 7/2015 | Cuddihy et al. |
| 9,080,895 B2 | 7/2015 | Martin et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |

(56) References Cited

U.S. PATENT DOCUMENTS

| | | |
|---|---|---|
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,296,410 B2* | 3/2016 | Isogai ............... B62D 1/18 |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,108 B2 | 6/2016 | Pfenninger et al. |
| 9,360,865 B2 | 6/2016 | Yopp |
| 9,421,994 B2 | 8/2016 | Agbor et al. |
| 9,487,228 B2 | 11/2016 | Febre et al. |
| 9,550,514 B2 | 1/2017 | Schulz et al. |
| 9,616,914 B2 | 4/2017 | Stinebring et al. |
| 9,643,641 B1 | 5/2017 | Stinebring et al. |
| 9,663,136 B2 | 5/2017 | Stinebring et al. |
| 9,744,983 B2 | 8/2017 | Stinebring et al. |
| 9,828,016 B2 | 11/2017 | Lubischer et al. |
| 9,845,106 B2 | 12/2017 | Bodtker |
| 9,849,904 B2 | 12/2017 | Rouleau |
| 9,862,403 B1 | 1/2018 | Rouleau et al. |
| 9,919,724 B2 | 3/2018 | Lubischer et al. |
| 10,065,655 B2 | 9/2018 | Bendewald et al. |
| 2002/0171235 A1 | 11/2002 | Riefe et al. |
| 2003/0046012 A1 | 3/2003 | Yamaguchi |
| 2003/0094330 A1 | 5/2003 | Boloorchi et al. |
| 2003/0146037 A1 | 8/2003 | Menjak et al. |
| 2003/0183440 A1 | 10/2003 | Thomas et al. |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099083 A1 | 5/2004 | Choi et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0242562 A1 | 11/2005 | Ridgway et al. |
| 2005/0263996 A1 | 12/2005 | Manwaring et al. |
| 2005/0275205 A1 | 12/2005 | Ahnafield |
| 2006/0005658 A1 | 1/2006 | Armstrong et al. |
| 2006/0186658 A1 | 8/2006 | Yasuhara et al. |
| 2006/0202463 A1 | 9/2006 | Schwarzbich et al. |
| 2006/0219499 A1 | 10/2006 | Organek |
| 2006/0224287 A1 | 10/2006 | Izawa et al. |
| 2006/0237959 A1 | 10/2006 | Dimig et al. |
| 2006/0244251 A1 | 11/2006 | Muller |
| 2006/0283281 A1 | 12/2006 | Li et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0096446 A1 | 5/2007 | Breed |
| 2007/0126222 A1* | 6/2007 | Koya ............... B62D 1/185<br>280/775 |
| 2007/0158116 A1 | 7/2007 | Peppler |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0047382 A1 | 2/2008 | Tomaru et al. |
| 2008/0079253 A1 | 4/2008 | Sekii et al. |
| 2008/0216597 A1 | 9/2008 | Iwakawa et al. |
| 2008/0238068 A1 | 10/2008 | Kumar et al. |
| 2008/0264196 A1 | 10/2008 | Schindler et al. |
| 2009/0024278 A1 | 1/2009 | Kondo et al. |
| 2009/0056493 A1 | 3/2009 | Dubay et al. |
| 2009/0107284 A1 | 4/2009 | Lucas et al. |
| 2009/0229400 A1 | 9/2009 | Ozsoylu et al. |
| 2009/0256342 A1 | 10/2009 | Cymbal et al. |
| 2009/0266195 A1 | 10/2009 | Tanke et al. |
| 2009/0276111 A1 | 11/2009 | Wang et al. |
| 2009/0280914 A1 | 11/2009 | Kakutani et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2011/0314954 A1 | 12/2011 | Matsuno et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2012/0247259 A1 | 10/2012 | Mizuno et al. |
| 2012/0287050 A1 | 11/2012 | Wu |
| 2013/0002416 A1 | 1/2013 | Gazit |
| 2013/0325202 A1 | 1/2013 | Howard et al. |
| 2013/0087006 A1 | 4/2013 | Ohtsubo et al. |
| 2013/0104689 A1 | 5/2013 | Marutani et al. |
| 2013/0133463 A1 | 5/2013 | Moriyama |
| 2013/0158771 A1 | 6/2013 | Kaufmann |
| 2013/0174686 A1 | 7/2013 | Hirche et al. |
| 2013/0199866 A1 | 8/2013 | Yamamoto et al. |
| 2013/0205933 A1 | 8/2013 | Moriyama |
| 2013/0218396 A1 | 8/2013 | Moshchuk et al. |
| 2013/0233117 A1 | 9/2013 | Read et al. |
| 2013/0325264 A1 | 12/2013 | Alcazar et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0111324 A1 | 4/2014 | Lisseman et al. |
| 2014/0116187 A1 | 5/2014 | Tinnin |
| 2014/0137694 A1 | 5/2014 | Sugiura |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 1/2015 | Hahne |
| 2015/0120142 A1 | 1/2015 | Park et al. |
| 2015/0210273 A1 | 2/2015 | Kaufmann et al. |
| 2015/0060185 A1 | 3/2015 | Feguri |
| 2015/0246673 A1 | 4/2015 | Tseng et al. |
| 2015/0137492 A1 | 5/2015 | Rao et al. |
| 2015/0203145 A1 | 7/2015 | Sugiura et al. |
| 2015/0203149 A1 | 7/2015 | Katayama et al. |
| 2015/0251666 A1 | 7/2015 | Attard et al. |
| 2015/0283998 A1 | 9/2015 | Lind et al. |
| 2015/0324111 A1 | 9/2015 | Jubner et al. |
| 2016/0009332 A1 | 1/2016 | Sirbu |
| 2016/0016604 A1* | 1/2016 | Johta ............... B62D 1/184<br>74/493 |
| 2016/0075371 A1 | 3/2016 | Varunkikar et al. |
| 2016/0082867 A1 | 3/2016 | Sugioka et al. |
| 2016/0200246 A1 | 3/2016 | Lisseman et al. |
| 2016/0114828 A1 | 4/2016 | Tanaka et al. |
| 2016/0185387 A1 | 6/2016 | Kuoch |
| 2016/0200343 A1 | 6/2016 | Lisseman et al. |

(56) References Cited

U.S. PATENT DOCUMENTS

| | | |
|---|---|---|
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1 | 8/2016 | Bendewald et al. |
| 2016/0244086 A1 | 8/2016 | Moriyama |
| 2016/0252133 A1 | 9/2016 | Caverly |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375770 A1 | 12/2016 | Ryne et al. |
| 2016/0375860 A1 | 12/2016 | Lubischer |
| 2016/0375923 A1 | 12/2016 | Schulz |
| 2016/0375924 A1 | 12/2016 | Bodtker et al. |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0097071 A1 | 4/2017 | Galehr |
| 2017/0106894 A1 | 4/2017 | Bodtker |
| 2017/0106895 A1* | 4/2017 | Jager .................. B62D 1/16 |
| 2017/0113589 A1 | 4/2017 | Riefe |
| 2017/0113712 A1 | 4/2017 | Watz |
| 2017/0151975 A1 | 7/2017 | Schmidt et al. |
| 2017/0294120 A1 | 10/2017 | Ootsuji |
| 2017/0297606 A1 | 10/2017 | Kim et al. |
| 2017/0341677 A1 | 11/2017 | Buzzard et al. |
| 2017/0361863 A1 | 12/2017 | Rouleau |
| 2017/0369091 A1 | 12/2017 | Nash |
| 2018/0029628 A1 | 2/2018 | Sugishita |
| 2018/0050720 A1 | 2/2018 | King et al. |
| 2018/0072339 A1 | 3/2018 | Bodtker |
| 2018/0079441 A1 | 3/2018 | McKinzie et al. |
| 2018/0086378 A1 | 3/2018 | Bell et al. |
| 2018/0111639 A1 | 4/2018 | Bodtker et al. |
| 2018/0148084 A1 | 5/2018 | Nash et al. |
| 2018/0154932 A1 | 6/2018 | Rakouth et al. |
| 2018/0229753 A1 | 8/2018 | Magnus et al. |
| 2018/0238400 A1 | 8/2018 | Magnus et al. |
| 2018/0251147 A1 | 9/2018 | Heitz et al. |
| 2018/0273081 A1 | 9/2018 | Lubischer et al. |
| 2018/0319367 A1 | 11/2018 | Ting |
| 2019/0002010 A1 | 1/2019 | Cao et al. |

FOREIGN PATENT DOCUMENTS

| | | |
|---|---|---|
| CN | 1722030 A | 1/2006 |
| CN | 1736786 A | 2/2006 |
| CN | 101037117 A | 9/2007 |
| CN | 101041355 A | 9/2007 |
| CN | 101049814 A | 10/2007 |
| CN | 101291840 A | 10/2008 |
| CN | 101402320 A | 4/2009 |
| CN | 101596903 A | 12/2009 |
| CN | 201534560 U | 7/2010 |
| CN | 101954862 A | 1/2011 |
| CN | 102161346 A | 8/2011 |
| CN | 102452391 A | 5/2012 |
| CN | 102452411 A | 5/2012 |
| CN | 102523738 A | 6/2012 |
| CN | 102574545 A | 7/2012 |
| CN | 202337282 U | 7/2012 |
| CN | 102806937 A | 12/2012 |
| CN | 103085854 A | 5/2013 |
| CN | 103129599 A | 6/2013 |
| CN | 103419840 A2 | 12/2013 |
| CN | 103448785 A | 12/2013 |
| CN | 103569185 A | 2/2014 |
| CN | 103587571 A | 2/2014 |
| CN | 203793405 U | 8/2014 |
| CN | 204222957 U | 3/2015 |
| CN | 104755346 A | 7/2015 |
| DE | 4310431 A1 | 10/1994 |
| DE | 19523214 A1 | 1/1997 |
| DE | 19923012 A1 | 11/2000 |
| DE | 19954505 A1 | 5/2001 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 1020081057313 A1 | 10/2009 |
| DE | 102010025197 A1 | 12/2011 |
| DE | 102013110865 A1 | 4/2015 |
| DE | 102015216326 B4 | 9/2016 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S58191668A A | 11/1983 |
| JP | S60157963 A | 8/1985 |
| JP | H05162652 A | 6/1993 |
| JP | 2006143117 A | 6/2006 |
| JP | 2007253809 A | 10/2007 |
| JP | 2012201334 A | 10/2012 |
| KR | 20100063433 A | 6/2010 |
| KR | 101062339 B1 | 9/2011 |
| KR | 20150010435 A | 1/2015 |
| WO | 2006099483 A1 | 9/2006 |
| WO | 2010082394 A1 | 7/2010 |
| WO | 2010116518 A1 | 10/2010 |
| WO | 2014208573 A1 | 12/2014 |

OTHER PUBLICATIONS

Gillespie, Thomas D.; "Fundamentals of Vehicle Dynamics"; Society of Automotive Engineers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Varunjikar, Tejas; Design of Horizontal Curves With DownGrades Using Low-Order Vehicle Dynamics Models; A Theisis by T. Varunkikar; 2011; 141 pages.
Chinese Office Action & Search Report for Chinese Application No. 201610427896.0 dated Oct. 27, 2017, 16 pages, English Translation Included.
Chinese Office Action & Search Report for Chinese Application No. 201610609647.3 dated Mar. 12, 2018, 5 pages, no English translation available.
Chinese Office Action & Search Report for Chinese Application No. 201610620335.2 dated Jan. 22, 2018, 15 pages, English Translation Included.
Chinese Office Action & Search Report for Chinese Application No. 201610642300.9 dated Feb. 7, 2018, 22 pages, English Translation Only.
Chinese Office Action & Search Report for Chinese Application No. 201610651953.3 dated Jan. 25, 2018, 12 pages, English Translation Included.
Chinese Office Action & Search Report for Chinese Application No. 201610830808.1 dated Apr. 3, 2018, 30 pages, English Translation Included.

(56) References Cited

OTHER PUBLICATIONS

Chinese Office Action & Search Report for Chinese Application No. 201610830809.6 dated Mar. 12, 2018, 11 pages, English Translation Included.
Chinese Office Action & Search Report for Chinese Application No. 201610830810.9 dated Jan. 31, 2018, 18 pages, English Translation Included.
Chinese Office Action & Search Report for Chinese Application No. 201611113746.9 dated May 4, 2018, 11 pages, English Translation Included.
Chinese Office Action for Chinese Application No. 201610427896.0 dated May 28, 2018 16 pages, English Translation Included.
CN Chinese Office Action & Search Report for Chinese Application No. 201610620335.2 dated Aug. 7, 2018, 16 pages, English Translation Included.
First Office Action regarding related CN App. No. 201710507179.3; dated Apr. 1, 2019; 4 pgs.

* cited by examiner

ADAS WHEEL LOCKING DEVICE

CROSS-REFERENCES TO RELATED APPLICATIONS

This patent application claims priority to U.S. Provisional Patent Application Ser. No. 62/355,578, filed Jun. 28, 2016, which is incorporated herein by reference in its entirety.

BACKGROUND

Autonomous driving assisted steering systems are being developed that are configured to steer a vehicle in certain circumstances. Responsibility to steer the vehicle may be transferred from the autonomous driving assisted steering system to the driver of the vehicle.

SUMMARY

According to an embodiment of the present disclosure, a steering column assembly is provided. The steering column assembly includes a first shaft assembly, a second shaft assembly, and a locking assembly. The first shaft assembly has a first shaft having a first shaft first end and a first shaft second end. The second shaft assembly has a second shaft that is at least partially received within the first shaft. The second shaft has a second shaft first end and a second shaft second end. The second shaft first end is disposed proximate the first shaft second end. The locking assembly is disposed about at least one of the first shaft and the second shaft and is arranged to inhibit rotation of at least one of the first shaft and the second shaft.

According to another embodiment of the present disclosure, a steering system is provided. The steering system includes an advanced driver assistance system arranged to selectively control a vehicle. The advanced driver assistance system is in communication with a steering column assembly. The steering column assembly includes a first shaft assembly, a second shaft assembly, and a locking assembly. The first shaft assembly has a first shaft having a first shaft first end and a first shaft second end. The second shaft assembly has a second shaft that extends between a second shaft first end and a second shaft second end. The second shaft is at least partially received within the first shaft. The locking assembly has a shaft lock sleeve that is operatively connected to the first shaft second end and a jacket sleeve that is disposed about and is spaced apart from the second shaft.

According to yet another embodiment of the present disclosure, a steering column assembly is provided. The steering column assembly includes a first shaft assembly, a second shaft assembly, and a locking assembly. The first shaft assembly includes a first shaft having a first shaft first surface and a first shaft second surface disposed opposite the first shaft first surface, each extending between a first shaft first end and a first shaft second end. The second shaft assembly includes a second shaft that extends at least partially through a jacket. The second shaft extends between a second shaft first end and a second shaft second end. The first shaft assembly is movable relative to the second shaft assembly between an extended position and a retracted position. The locking assembly is disposed within the jacket and is arranged to selectively inhibit rotation of the first shaft relative to the second shaft. The locking assembly includes a shaft lock sleeve that is operatively connected to the first shaft first surface proximate the first shaft second end and a jacket sleeve that is operatively connected to the jacket.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicles such as an autonomous vehicle, an autonomously driven vehicle, or a selectively autonomous vehicle may be provided with an advanced driver assistance system (ADAS). The ADAS is configured to selectively operate or control the vehicle such that the vehicle is able to perform operations without continuous input from a driver (e.g. steering, accelerating, braking, maneuvering, etc.). The ADAS enables the vehicle to be at least partially autonomously operated or controlled using sensing, steering, and/or braking technology without continuous input from a driver (e.g. steering, accelerating, braking, maneuvering, etc.). A driver of the vehicle is able to selectively activate or deactivate the ADAS via a switch or other mechanism. A vehicle control or monitoring system is able to selectively activate or deactivate the ADAS in response to events occurring within or external to the vehicle.

Figure 1:
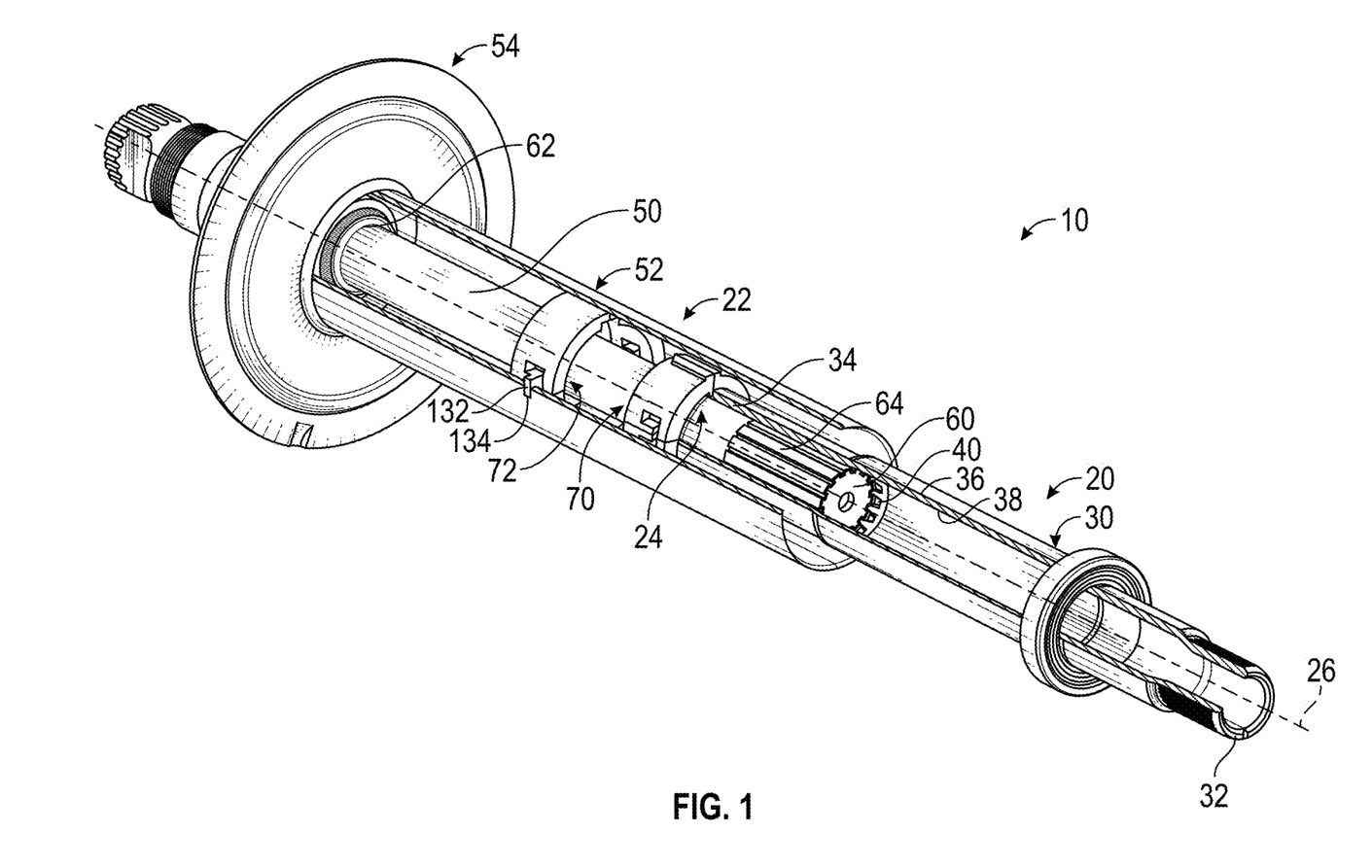
FIG. 1 a partial cross-sectional view of a steering column assembly.
Figure 2:
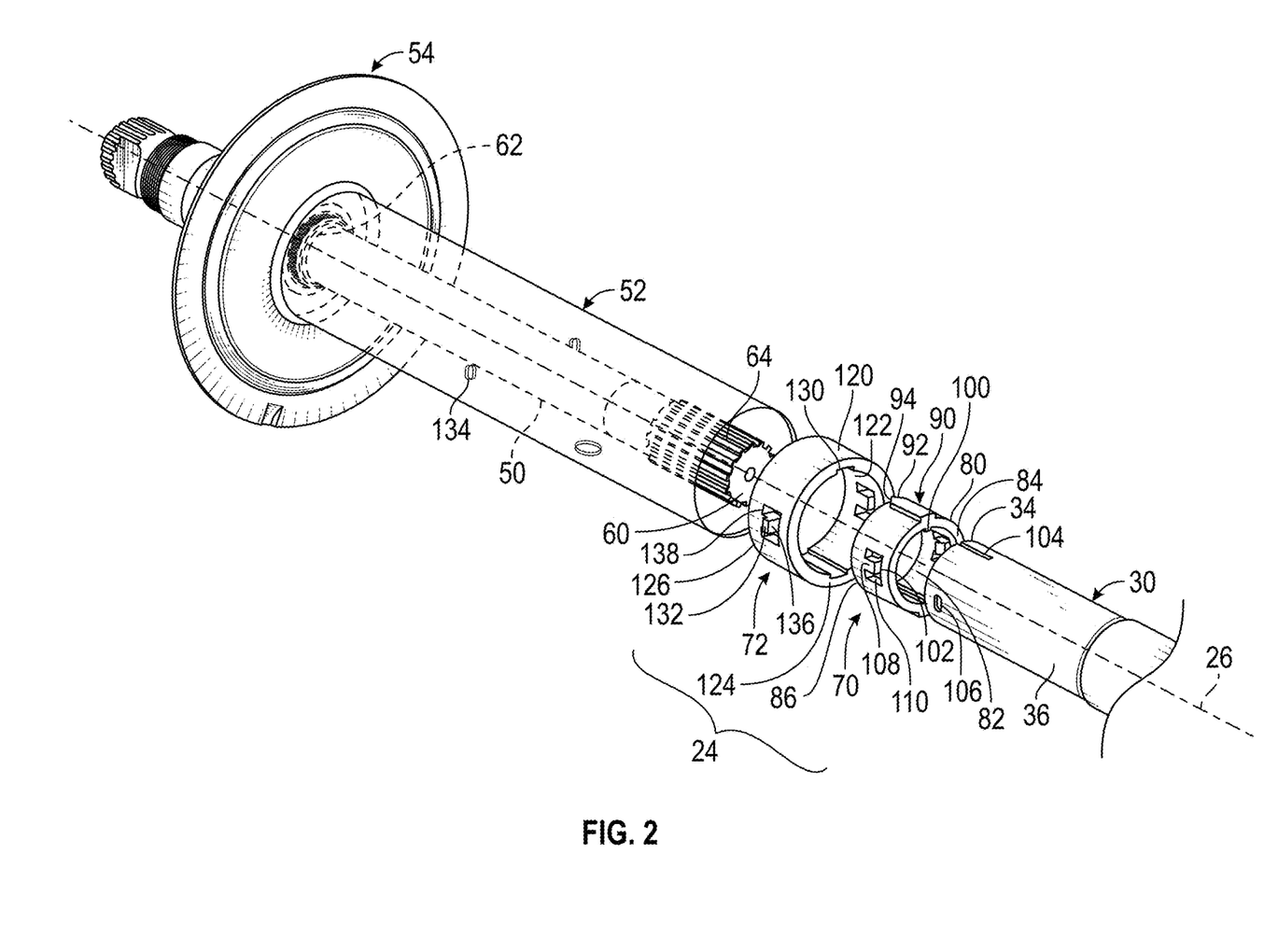
FIG. 2 is a partial disassembled view of the steering column assembly.

Referring to FIGS. 1 and 2, the vehicle may be provided with a steering system having that is in communication with the ADAS. The steering column assembly 10 includes a steering wheel that is configured to selectively receive and/or provide directional control to the vehicle from a driver of the vehicle based on the operational state of the ADAS. The driver of the vehicle is able to provide directional control of the vehicle through the steering wheel while the ADAS is deactivated or is in a "standby" mode. The driver of the vehicle is inhibited from providing directional control of the vehicle through the steering wheel while the ADAS is activated.

The steering wheel of the steering column assembly 10 may be operatively decoupled from a steering mechanism or a steering gear of the steering system while the ADAS is activated. It is to be appreciated that "decoupling" the steering wheel from the steering column assembly 10 may be done mechanically, electrically, or a combination thereof The steering column assembly 10 includes a first shaft assembly 20, a second shaft assembly 22, and a locking assembly 24 all extending along a steering column axis 26.

The steering column assembly 10 may be provided with be an electronic actuator, a hydraulic actuator, a pneumatic actuator, or an electromechanical actuator that is configured to move the first shaft assembly 20 relative to the second shaft assembly 22 between an extended position (un-stowed position) and a retracted position (stowed position) along the steering column axis 26. In at least one embodiment, an operator of the vehicle may be able to manually move the steering column assembly 10 between the extended position and the retracted position.

The extended position corresponds to a ready for driving position of the steering wheel that is operatively connected to the steering column assembly 10 while the ADAS is deactivated. The retracted position corresponds to a non-driving position of the steering wheel that is operatively connected to the steering column assembly 10 while the ADAS is activated. The non-driving position of the steering wheel that is operatively connected to the steering column assembly 10 may be a position in which the steering wheel is disposed proximate or at least partially recessed within a vehicle instrument panel.

The first shaft assembly 20 includes a first shaft 30. The first shaft 30 may be a solid or a hollow shaft that extend along the steering column axis 26 between a first shaft first end 32 and a first shaft second end 34. The steering wheel is operatively connected to the first shaft first end 32. The first shaft 30 includes a first shaft first surface 36 and a first shaft second surface 38 that is disposed opposite the first shaft first surface 36. The first shaft first surface 36 and the first shaft second surface 38 each extend along the steering column axis 26 between the first shaft first end 32 and the first shaft second end 34. The first shaft first surface 36 is configured as an external surface of the first shaft 30. The first shaft second surface 38 is configured as an internal surface of the first shaft 30.

The first shaft 30 may be provided with a non-round cross-section having an octagonal shape, a cloverleaf shape, a triangular shape, a rounded rectangular shape, a splined shape, or the like. As illustrated, the first shaft 30 defines a first splined portion 40 that extends from the first shaft second end 34 towards the first shaft first end 32. The first splined portion 40 extends from the first shaft second surface 38 towards the first shaft first end 32.

The second shaft assembly 22 is operably connected to the first shaft assembly 20. The second shaft assembly 22 includes a second shaft 50. The second shaft 50 extends at least partially through a jacket 52.

The second shaft 50 may be a solid or a hollow shaft that extend along the steering column axis 26 between a second shaft first end 60 and a second shaft second end 62. The second shaft 50 is at least partially received within the first shaft 30 such that the second shaft first end 60 is at least partially received within the first shaft second end 34.

The second shaft 50 may be provided with a non-round cross-section that is complementary to the non-round cross-section of the first shaft 30. The non-round cross-section may have an octagonal shape, a cloverleaf shape, a triangular shape, a rounded rectangular shape, a splined shape, or the like. As illustrated, the second shaft 50 defines a second splined portion 64 that extends from the second shaft first end 60 towards the second shaft second end 62. The second splined portion 64 may be an over molded plastic part or the like that is molded over the second shaft first end 60.

Figure 5:
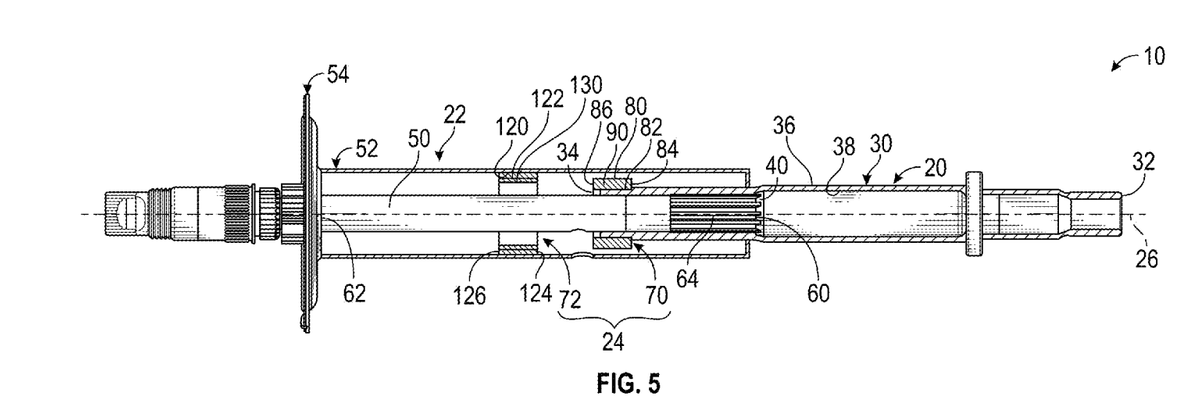
FIG. 5 is partial cross-sectional view of the steering column assembly in an extended position.

The second splined portion 64 is arranged to selectively engage the first splined portion 40. The second splined portion 64 is arranged to engage the first splined portion 40 and the second shaft first end 60 is disposed proximate the first shaft second end 34 while the first shaft assembly 20 and the second shaft assembly 22 of the steering column assembly 10 are in the extended position, as shown in FIG. 5. The first shaft assembly 20 and the second shaft assembly 22 are enabled to rotate together about the steering column axis 26, while in the extended position.

Figure 6:
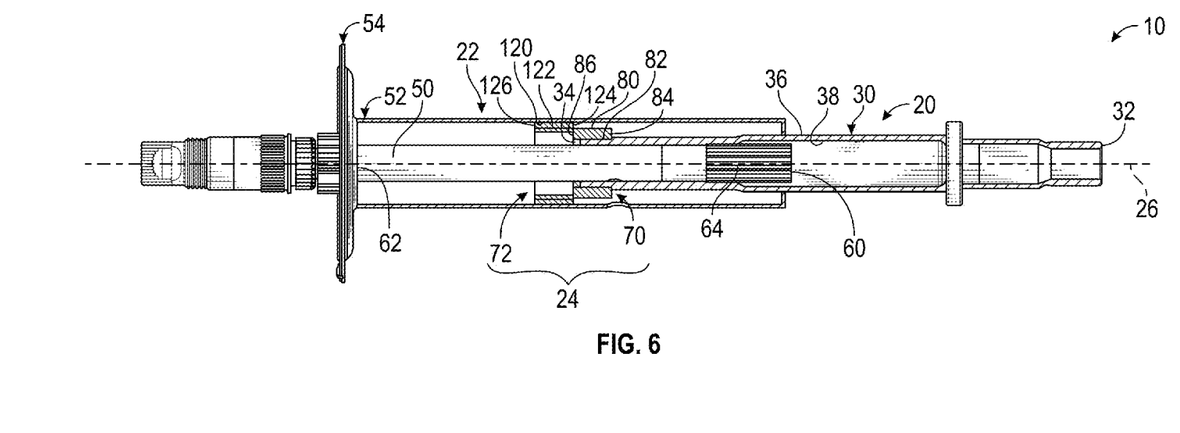
FIG. 6 is a partial cross-sectional view of the steering column assembly moving from the extended position towards the retracted position.

The second splined portion 64 is arranged to at least partially engage the first splined portion 40 while the steering column assembly 10 moves from the extended position towards the retracted position. The first shaft second end 34 moves progressively closer to the second shaft second end 62, while the steering column assembly 10 moves from the extended position towards the retracted position, as shown in FIG. 6. The first shaft assembly 20 and the second shaft assembly 22 are enabled to rotate together about the steering column axis 26 while the second splined portion 64 is at least partially engaged with the first splined portion 40.

Figure 7:
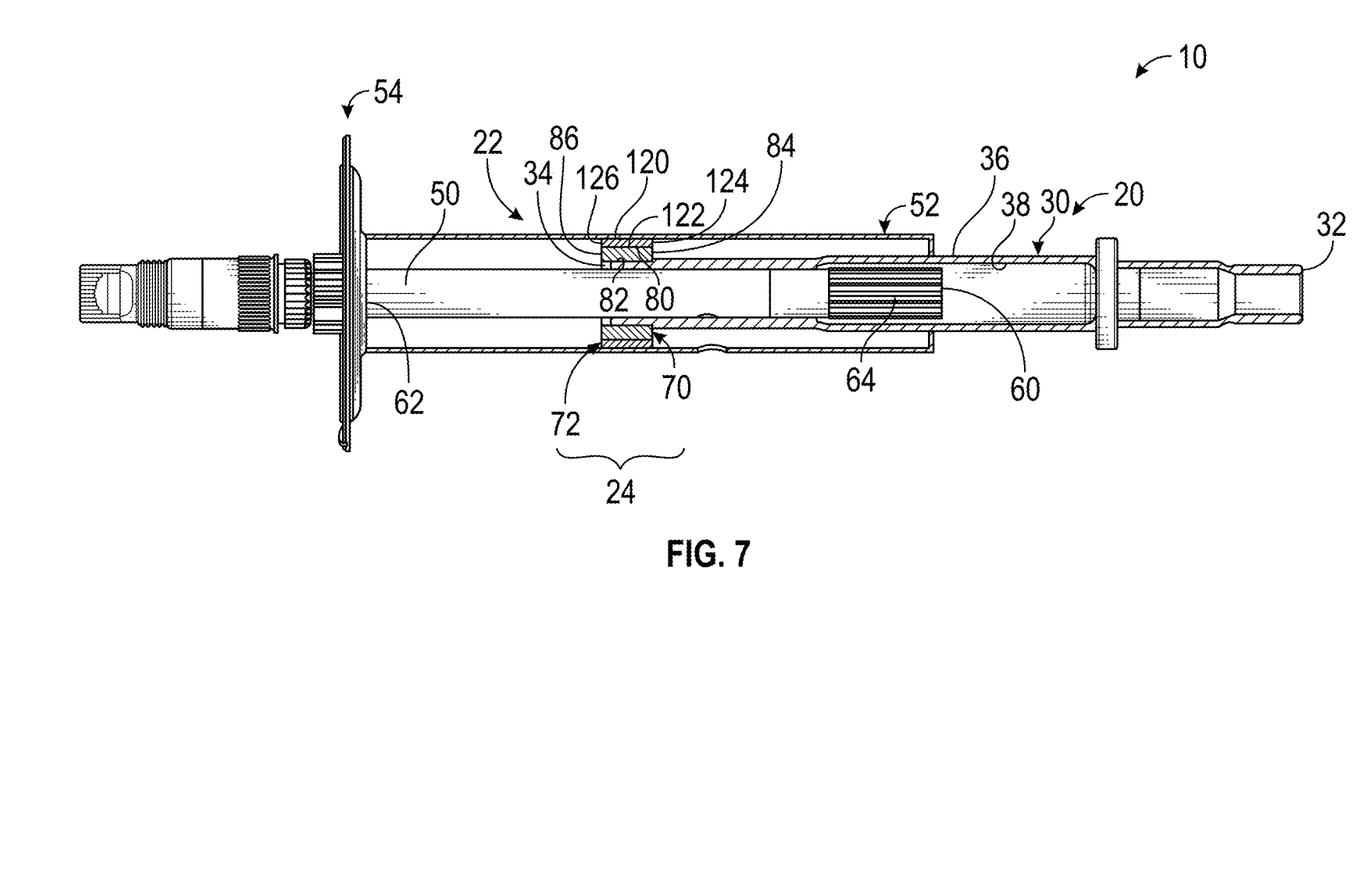
FIG. 7 is a partial cross-sectional view of the steering column assembly in the retracted position.

The second splined portion 64 is spaced apart from the first splined portion 40 and the second shaft first end 60 is spaced apart from the first shaft second end 34 while the steering column assembly 10 is in the retracted position. The first shaft second end 34 is disposed proximate the second shaft second end 62 while in the retracted position, as shown in FIG. 7. The second shaft 50 is enabled to rotate about the steering column axis 26 and the first shaft 30 is inhibited from rotating about the steering column axis 26 the locking assembly 24, while in the retracted position and the ADAS is activated.

Figure 3:
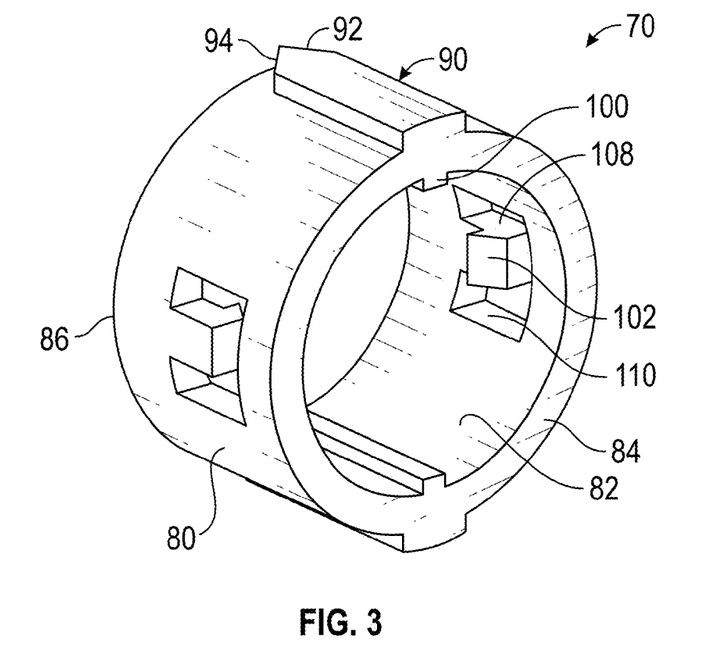
FIG. 3 is a perspective view of a shaft lock sleeve of the steering column assembly.

Referring to FIGS. 1-3, the locking assembly 24 may be disposed within the jacket 52. The locking assembly 24 is disposed about portions of at least one of the first shaft 30 and the second shaft 50. The locking assembly 24 is arranged to inhibit rotation of the first shaft 30 while the steering column assembly 10 is in the retracted position. The second shaft 50 may be enabled to continue to rotate when the first shaft 30 is locked or is inhibited from rotating. The locking assembly 24 includes a shaft lock sleeve 70 and a jacket sleeve 72.

Referring to FIGS. 2 and 3, the shaft lock sleeve 70 is disposed about and is operatively connected to the first shaft 30. In at least one embodiment, the shaft lock sleeve 70 is disposed about and is operatively connected to the second shaft 50. The shaft lock sleeve 70 is disposed proximate the first shaft second end 34. The shaft lock sleeve 70 is configured to translate with the first shaft 30 as the first shaft assembly 20 moves relative to the second shaft assembly 22 between the extended position and the retracted position.

The shaft lock sleeve 70 includes a shaft lock sleeve first surface 80 and a shaft lock sleeve second surface 82 that is disposed opposite the shaft lock sleeve first surface 80. The shaft lock sleeve first surface 80 and the shaft lock sleeve second surface 82 each extend between a shaft lock sleeve first end 84 and a shaft lock sleeve second end 86. The shaft lock sleeve second surface 82 engages the first shaft first surface 36.

The shaft lock sleeve 70 is provided with an orientation feature 90. The orientation feature 90 may be configured as a protrusion or protuberance that is disposed on or defined by the shaft lock sleeve first surface 80. The orientation feature 90 extends between the shaft lock sleeve first end 84 and the shaft lock sleeve second end 86. The orientation feature 90 extends away from the shaft lock sleeve first surface 80.

A portion of the orientation feature 90 that is disposed proximate the shaft lock sleeve second end 86 includes a first side surface 92 and the second side surface 94 that is disposed opposite the first side surface 92. The first side surface 92 and the second side surface 94 become progressively closer to each other in a direction that extends from the shaft lock sleeve first end 84.

In at least one embodiment, another key is disposed opposite the orientation feature 90 and has a substantially similar configuration as the orientation feature 90. The another key is spaced apart from the orientation feature 90 by 180° though other locations of the another key are also contemplated.

In at least one embodiment, the shaft lock sleeve 70 is provided with a shear feature 100. The shear feature 100 may be configured as a protrusion or protuberance that is disposed on or defined by the shaft lock sleeve second surface 82. The shear feature 100 may be a break away feature that holds under normal operating conditions and may become deformed, crushed, sheared, fractured, or breaks away during a steering column collapse event. The shear feature 100 extends between the shaft lock sleeve first end 84 and the shaft lock sleeve second end 86. The shear feature 100 extends away from the shaft lock sleeve second surface 82. The shear feature 100 may be disposed opposite the orientation feature 90. The shear feature 100 is configured to engage or be received within a slot or an elongated opening 104 that is defined by the first shaft 30. The elongated opening 104 extends from the first shaft second end 34 towards the first shaft first end 32.

In at least one embodiment, the shaft lock sleeve 70 may be provided with a retaining feature 102 that extends towards the steering column axis 26. The retainer feature 102 is configured to engage or be received within a slot or retaining opening 106 that is defined by the first shaft 30 and is disposed proximate the first shaft second end 34. The retaining feature 102 is provided as part of an extension or a finger 108 that extends into a window 110 that is completely defined by the shaft lock sleeve 70. The window 110 extends from the shaft lock sleeve first surface 80 to the shaft lock sleeve second surface 82.

Figure 4:
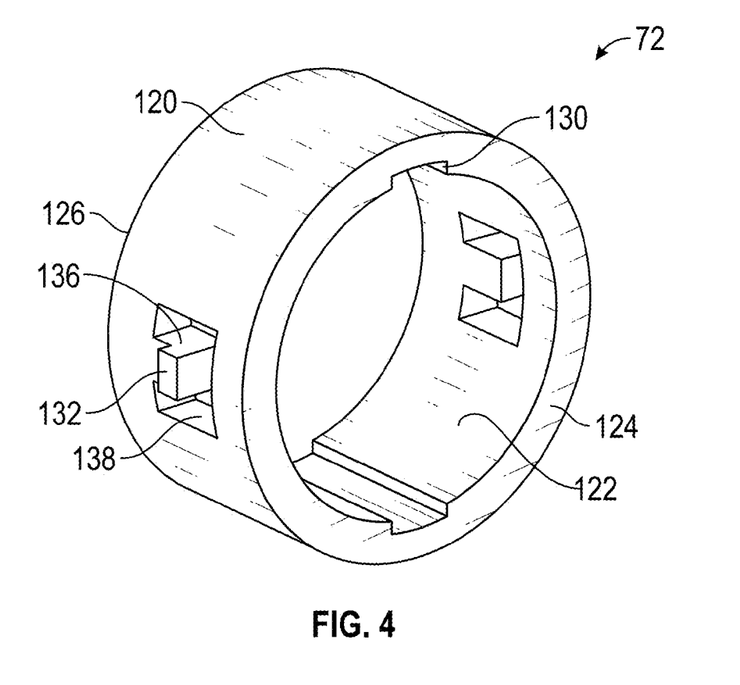
FIG. 4 is a perspective view of a jacket sleeve of the steering column assembly.

Referring to FIGS. 2 and 4, the jacket sleeve 72 is disposed about and is spaced apart from the second shaft 50. In at least one embodiment, the jacket sleeve 72 is disposed about and is spaced apart from the first shaft 30. The jacket sleeve 72 is disposed on or defined by an inner surface of the jacket 52. The jacket sleeve 72 is arranged to at least partially receive the shaft lock sleeve 70. The receiving of the shaft lock sleeve 70 within the jacket sleeve 72 inhibits rotation of the first shaft assembly 20 relative to the second shaft assembly 22 about the steering column axis 26.

The jacket sleeve 72 includes a jacket sleeve first surface 120 and a jacket sleeve second surface 122 that is disposed opposite the jacket sleeve first surface 120. The jacket sleeve first surface 120 and the jacket sleeve second surface 122 each extend between a jacket sleeve first end 124 and a jacket sleeve second end 126. The jacket sleeve first surface 120 engages an internal surface of the jacket 52.

The jacket sleeve 72 is provided with or defines a key way 130. The key way 130 may be configured as a slot, opening, or the like that is arranged to receive the orientation feature 90 as the first shaft assembly 20 moves towards the retracted position to inhibit rotation of the first shaft 30 relative to the second shaft 50 about the steering column axis 26. The key way 130 extends from the jacket sleeve second surface 122 towards the jacket sleeve first surface 120. The key way 130 extends from the jacket sleeve first end 124 towards the jacket sleeve second end 126.

In at least one embodiment, another key way is disposed opposite the key way 130 and has a substantially similar configuration as the key way 130. The another key way is spaced apart from the key way 130 by 180° though other locations of the another key are also contemplated. The another key way is arranged to receive the another key of the shaft lock sleeve 70.

In at least one embodiment, the first shaft 30 may define or may be provided with all of the features of the shaft lock sleeve 70 (e.g. the orientation feature 90) such that an orientation feature is disposed proximate the second end 34 or extends from the first shaft first surface 36 proximate the second end 34. The jacket 52 may define or may be provided with all of the features of the jacket sleeve 72 (e.g. the key way 130) such that a key way is defined within the jacket 52 or is defined by the inner surface of the jacket 52. In such a configuration, the first shaft 30 and the jacket 52 define the locking assembly 24.

In further embodiments, the first shaft 30 may define or may be provided with all of the features of the shaft lock sleeve 70 (e.g. the orientation feature 90) such that an orientation feature extends from the first shaft first surface 36 proximate the second end 34. The orientation feature is arranged or configured to be received within the key way 130 of the jacket sleeve 72.

In still further embodiments, the jacket 52 may define or may be provided with all of the features of the jacket sleeve 72 (e.g. the key way 130) such that a key way is defined by the inner surface of the jacket 52. The key way is arranged or configured to receive the orientation feature 90 of the shaft lock sleeve 70.

In at least one embodiment, the jacket sleeve 72 is provided with a jacket retaining feature 132. The jacket retaining feature 132 extends away from the steering column axis 26. The jacket retaining feature 132 is configured to engage or be received within a slot or opening 134 that is defined by the jacket 52. The jacket retaining feature 132 is provided as part of a finger or an extension 136 that extends into a window 138 that is completely defined by the jacket sleeve 72. In such an embodiment, the jacket sleeve 72 is fixedly positioned relative to the shaft lock sleeve 70.

Referring to FIGS. 5-7, the process of the steering column assembly 10 moving from the extended position towards the retracted position as illustrated. As shown in FIG. 5, the first shaft assembly 20 is in the extended position relative to the second shaft assembly 22. The shaft lock sleeve 70 is spaced apart from the jacket sleeve 72, such that the orientation feature 90 is spaced apart from the key way 130, and the first splined portion 40 is engaged with the second splined portion 64, while the first shaft assembly 20 is in the extended position.

As shown in FIG. 6, responsive to the activation of the ADAS, the first shaft assembly 20 moves from the extended position towards the retracted position. During the transition between the extended position and the retracted position, the stowing process, the shaft lock sleeve 70 may be disposed proximate the jacket sleeve 72 such that a portion of the orientation feature 90 is at least partially received within the key way 130 and the first splined portion 40 is at least partially engaged with the second splined portion 64. The partial engagement between the first splined portion 40 and the second splined portion 64 allows the first shaft assembly 20 to be rotated such that the orientation feature 90 is proximately aligned with the key way 130.

The first shaft assembly 20 may be manually rotated by a driver the vehicle may be automatically rotated by an electromechanical device such that the orientation feature 90 is aligned with the key way 130 such that the shaft lock sleeve 70 may be at least partially received within the jacket sleeve 72. In at least one embodiment, responsive to a misalignment between the orientation feature 90 and the key way 130, at least one of the first side surface 92 and the second side surface 94 may engage and ride along an edge of the key way 130 such that the first shaft assembly 20 and the shaft lock sleeve 70 rotate about the steering column axis 26 to center or proximately align the orientation feature 90 and the key way 130 to facilitate the first shaft assembly 20 moving towards the retracted position.

As shown in FIG. 7, the orientation feature 90 is substantially received within the key way 130 and the first splined portion 40 is spaced apart from the second splined portion 64. The substantial reception of the orientation feature 90 of the shaft lock sleeve 70 within the key way 130 of the jacket sleeve 72 inhibits the first shaft 30 of the first shaft assembly 20 from being rotated about the steering column axis 26 relative to the second shaft 50 of the second shaft assembly 22 while the first shaft assembly 20 is in the retracted position. The inhibiting of rotation of the first shaft 30 of the first shaft assembly 20 maintains the steering wheel that is connected to the steering column assembly 10 in a non-rotating position. The second shaft 50 of the second shaft assembly 22 may still be able to rotate to apply an input to the steering gear steering mechanism.

The locking assembly 24 enables the steering wheel that is operably connected to the steering column assembly 10 to be maintained in a non-rotational state, while maintaining the option to reengage a mechanical link, via the first shaft assembly 20 and the second shaft assembly 22, between the steering wheel and vehicle road wheels. Furthermore, at least one of the shear feature 100 and the retaining feature 102 of the shaft lock sleeve 70 may shear, break away, deform, or bend away during a vehicle impact event to enable the first shaft assembly 20 to move from the extended position towards the retracted position to collapse the steering column assembly 10.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or various combinations of the described embodiments. Accordingly, the present disclosure is not to be seen as limited by the foregoing description.

What is claimed is:

1. A steering column assembly comprising:
   a first shaft assembly having a first shaft having a first shaft first end and a first shaft second end;
   a second shaft assembly having a second shaft that is at least partially received within the first shaft, the second shaft having a second shaft first end and a second shaft second end, the second shaft first end being disposed proximate the first shaft second end; and
   a locking assembly disposed about at least one of the first shaft and the second shaft and arranged to inhibit rotation of at least one of the first shaft and the second shaft, the locking assembly comprising:
   a shaft lock sleeve disposed about the first shaft; and
   a jacket sleeve disposed about and spaced apart from the second shaft.

2. The steering column assembly of claim 1, wherein the jacket sleeve defines a key way.

3. The steering column assembly of claim 2, wherein the shaft lock sleeve defines an orientation feature that is arranged to be received within the key way.

4. The steering column assembly of claim 3, wherein the first shaft assembly is movable relative to the second shaft assembly between an extended position and a retracted position.

5. The steering column assembly of claim 4, wherein while the first shaft assembly is in the extended position, the shaft lock sleeve is spaced apart from the jacket sleeve.

6. The steering column assembly of claim 4, wherein while the first shaft assembly moves towards the retracted position, the orientation feature is at least partially received within the key way.

7. The steering column assembly of claim 4, wherein while the first shaft assembly is in the retracted position, the orientation feature is at least partially received within the key way and the second shaft first end is spaced apart from the first shaft second end.

8. A steering system having a steering column assembly in communication with an advanced driver assistance system that is arranged to selectively control a vehicle, the steering column assembly comprising:
   a first shaft assembly having a first shaft that extends between a first shaft first end and a first shaft second end;
   a second shaft assembly having a second shaft that extends between a second shaft first end and a second shaft second end, the second shaft being at least partially received within the first shaft; and
   a locking assembly having a shaft lock sleeve operatively connected to the first shaft second end and a jacket sleeve disposed about and spaced apart from the second shaft.

9. The steering system of claim 8, wherein the shaft lock sleeve includes a shaft lock sleeve first surface and a shaft lock sleeve second surface disposed opposite the shaft lock sleeve first surface, each extending between a shaft lock sleeve first end and a shaft lock sleeve second end, the shaft lock sleeve first surface defines an orientation feature that extends between the shaft lock sleeve first end and the shaft lock sleeve second end.

10. The steering system of claim 9, wherein the shaft lock sleeve second surface engages the first shaft.

11. The steering system of claim 9, wherein the orientation feature includes a first side surface and a second side surface that become progressively closer to each other in a direction that extends from the shaft lock sleeve first end towards the shaft lock sleeve second end.

12. The steering system of claim 9, wherein the jacket sleeve includes a jacket sleeve first surface and a jacket sleeve second surface disposed opposite the jacket sleeve first surface, each extending between a jacket sleeve first end and a jacket sleeve second end, the jacket sleeve defines a key way that extends from the jacket sleeve second surface towards the jacket sleeve first surface.

13. The steering system of claim 12, wherein the key way is arranged to receive the orientation feature to inhibit rotation of the first shaft relative to the second shaft.

14. The steering system of claim 12, wherein the jacket sleeve first surface engages a jacket through which the second shaft is at least partially received.

15. A steering column assembly, comprising:
a first shaft assembly including a first shaft having a first shaft first surface and a first shaft second surface disposed opposite the first shaft first surface, each extending between a first shaft first end and a first shaft second end;
a second shaft assembly including a second shaft that extends at least partially through a jacket, the second shaft extending between a second shaft first end and a second shaft second end, the first shaft assembly being movable relative to the second shaft assembly between an extended position and a retracted position; and
a locking assembly disposed within the jacket and arranged to selectively inhibit rotation of the first shaft relative to the second shaft, the locking assembly including a shaft lock sleeve that is operatively connected to the first shaft first surface proximate the first shaft second end and a jacket sleeve that is operatively connected to the jacket.

16. The steering column assembly of claim 15, wherein the shaft lock sleeve includes a shaft lock sleeve first surface and a shaft lock sleeve second surface each extending between a shaft lock sleeve first end and a shaft lock sleeve second end, the shaft lock sleeve first surface including an orientation feature that extends away from the shaft lock sleeve first surface.

17. The steering column assembly of claim 16, wherein the jacket sleeve includes a jacket sleeve first surface and a jacket sleeve second surface disposed opposite the jacket sleeve first surface, each extending between a jacket sleeve first end and a jacket sleeve second end, the jacket sleeve second surface defines a key way that extends from the jacket sleeve first end towards the jacket sleeve second end.

18. The steering column assembly of claim 17, wherein while the first shaft assembly is in the extended position, the orientation feature is spaced apart from the key way.

19. The steering column assembly of claim 17, wherein while the first shaft assembly is in the retracted position, the orientation feature is received within the key way and the first shaft is inhibited from rotating relative to the second shaft.

* * * * *